United States Patent
Taylor et al.

(10) Patent No.: US 11,348,214 B2
(45) Date of Patent: May 31, 2022

(54) SYSTEM AND METHOD FOR MEASURING IMAGE ON PAPER REGISTRATION USING CUSTOMER SOURCE IMAGES

(71) Applicant: Xerox Corporation, Norwalk, CT (US)

(72) Inventors: Douglas R. Taylor, Webster, NY (US); Stuart A. Schweid, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 61 days.

(21) Appl. No.: 16/988,183

(22) Filed: Aug. 7, 2020

(65) Prior Publication Data
US 2022/0044373 A1    Feb. 10, 2022

(51) Int. Cl.
| G06T 7/00 | (2017.01) |
| G06T 5/50 | (2006.01) |
| G06T 5/00 | (2006.01) |
| B41J 29/393 | (2006.01) |

(52) U.S. Cl.
CPC ............... *G06T 5/50* (2013.01); *G06T 5/006* (2013.01); *B41J 29/393* (2013.01)

(58) Field of Classification Search
CPC .......... H04N 1/00; G06K 15/02; G06K 15/00; G06K 9/00; G06K 9/36; G06K 9/46; G06T 7/00; G06T 7/33
See application file for complete search history.

(56) References Cited

U.S. PATENT DOCUMENTS

| 6,373,042 B1 | 4/2002 | Kretschmann et al. |
| 7,519,222 B2 | 4/2009 | Kisilev et al. |
| 7,773,774 B2 | 8/2010 | Rasmussen et al. |
| 8,553,280 B2 | 10/2013 | Hoover et al. |
| 2005/0046889 A1* | 3/2005 | Braudaway ............ G06K 17/00 358/1.14 |
| 2011/0109918 A1 | 5/2011 | Conlon et al. |
| 2014/0183854 A1* | 7/2014 | Tian ........................ G07D 7/206 283/67 |
| 2020/0084320 A1* | 3/2020 | Xiao ..................... G06K 9/4642 |
| 2021/0264581 A1* | 8/2021 | Ishii ...................... G06K 15/027 |
| 2021/0274050 A1* | 9/2021 | Morita .................. H04N 1/00737 |

(Continued)

OTHER PUBLICATIONS

"Xerox® PrintInspect solution", 2 pages (2019), downloaded at https://www.xerox.com/digital-printing/latest/IG5DS-15U.PDF.

(Continued)

*Primary Examiner* — Li Liu
(74) *Attorney, Agent, or Firm* — Fay Sharpe, LLP

(57) ABSTRACT

A system and method are provided for registering source and target images. The method includes receiving a first source image and a first scanned image. The first scanned image is one that has been generated by scanning a printed page that has been generated by printing the first source image or a transformed first source image derived from the first source image. Locations of corners of a target image in the first scanned image are identified. With a first computed transform, the corners of the target image in the first scanned image are aligned to corners of the first source image to generate an aligned target image. Local features in the source image and aligned target image are detected. A second transform is computed to align the target image with the first source image, based on the detected local features.

20 Claims, 7 Drawing Sheets

(56) References Cited

U.S. PATENT DOCUMENTS

2021/0405936 A1* 12/2021 Kawamura ............. G06T 7/001

OTHER PUBLICATIONS

"Be Ingenious", 4 pages (2019), downloaded at https://www.xerox.com/digital-printing/latest/IG5DS-04U.PDF.
R A Sizyakin, et al., "Image defect detection algorithm based on deep learning," IOP Conf. Ser.: Mater. Sci. Eng., vol. 680, pp. 1-7, XV International Scientific-Technical Conference "Dynamics of Technical Systems" Sep. 11-13, 2019, Don State Technical University, Rostov-on-Don, Russian Federation.
Harris, et al., "A combined corner and edge detector," Alvey Vision Conference, pp. 147-151 (1988).

* cited by examiner

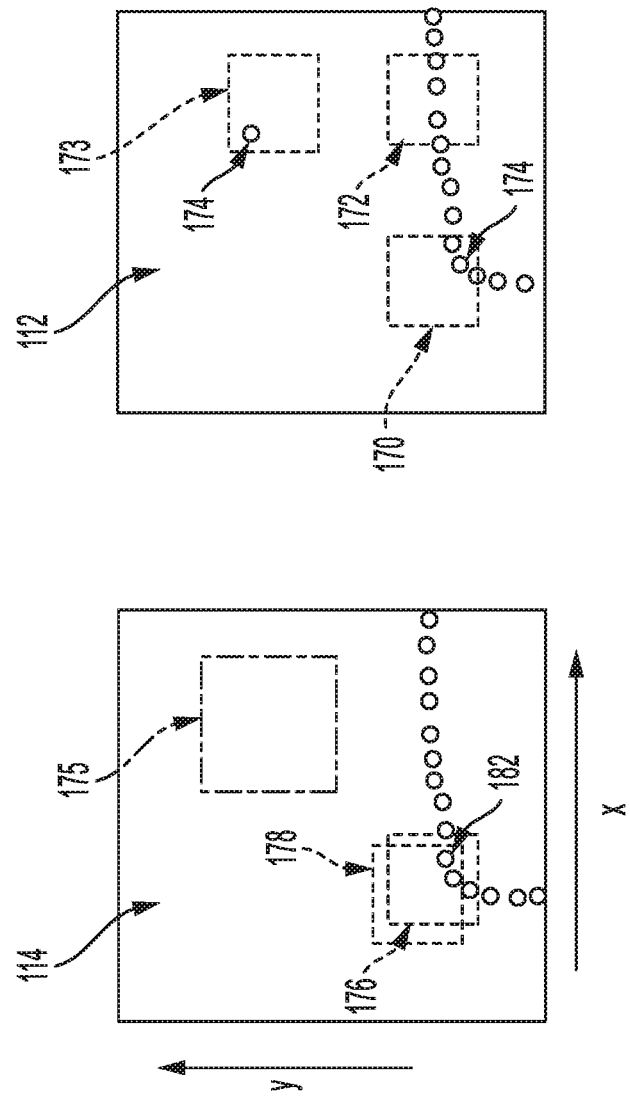

SYSTEM AND METHOD FOR MEASURING IMAGE ON PAPER REGISTRATION USING CUSTOMER SOURCE IMAGES

BACKGROUND

The exemplary embodiment relates to image registration and finds particular application in a system and method for improved registration between a source image and a printed image.

When printing a digital source image (such as a scanned image) on paper, registration errors can occur, resulting in geometric differences between the printed (target) image and the source image as well as poor alignment between a printed target image on a front side of a sheet and a printed target image on a reverse side of the sheet. Image on paper registration (IOP) and front to back image alignment has often been solved by printing and measuring specifically designed test patterns during diagnostic or setup routines, where the distance between edges of the paper and specific marks are measured, either manually or automatically. The printing device is then calibrated to reduce or eliminate the errors.

One problem with this approach is that it is time consuming and thus often impractical to perform for every image. Additionally, over time, the printing device may suffer drift, for a variety of reasons, and recalibration is needed to bring the device back into compliance.

Described herein is a method and system for measuring registration errors between a source image and a printed image in real-time. Advantages of such a system and method may include eliminating or reducing the need for running separate diagnostic routines, reducing waste (paper and ink used during setup routines, as well as defective pages due to poor registration) and increased productivity.

INCORPORATION BY REFERENCE

The following references, the disclosures of which are incorporated herein by reference in their entireties, are mentioned:

U.S. Pat. No. 6,373,042, issued Apr. 16, 2002, entitled REGISTRATION SYSTEM FOR A DIGITAL PRINTER WHICH PRINTS MULTIPLE IMAGES ON A SHEET, by Kretschmann, et al., describes a printing apparatus which forms multiple images on a sheet in separate operations. An edge position detector upstream of each marking device determines the location of the sheet so that an image may be precisely placed on the sheet. The system is said to ensure that images on both sides of a sheet are in registration with each other.

U.S. Pat. No. 8,553,280, issued Oct. 8, 2013, entitled IMAGE ON PAPER REGISTRATION USING IMAGE MARKS, by Hoover, et al., describes a method for adjusting the registration of images printed on paper. A first image location is determined on one sheet by measuring distances from two adjoining edges of the respective corners to a fiducial mark. The location measurements are used to adjust a second image to be transferred to another sheet.

U.S. Pub. No. 20110109918, published May 12, 2011, entitled CONTROLLING PLACEMENT AND MINIMIZING DISTORTION OF IMAGES IN AN IMAGING DEVICE, by Conlon, et al., describes a method to control an imaging device. Collections of two-dimensional image points in respective vector spaces are received for source and target images. The two collections of two-dimensional image points are converted into a homogenous form to apply affine matrix transformations. A matrix transformation is solved to map the first collection to the second collection. The matrix transformation is used to adjust distortion of the target image in an imaging device.

U.S. Pat. No. 7,519,222, issued Apr. 14, 2009, entitled PRINT DEFECT DETECTION, by Kisilev, et al., describes automatic detection of print defects in printed matter. Detail maps of a reference image and a corresponding scanned image are generated by identifying differences between pixels in each of one or more directions. Blocks of the reference image detail map and the respective blocks of the scanned image detail maps are compared.

U.S. Pat. No. 7,773,774, issued Aug. 10, 2010, entitled DYNAMIC TEST PATTERN COMPOSITION FOR IMAGE-ANALYSIS BASED AUTOMATIC MACHINE DIAGNOSTICS, by Rasmussen, et al., describes a system and method for test target selection in conjunction with dynamic test pattern generation. A test pattern page is composed using an optimal set of test targets, which can be accommodated or adjusted to fit within size constraints of the test pattern, based on layout optimization to ensure that related and optimized test targets are accommodated on a single test pattern.

U.S. Pub No. 20060165292, published Jul. 27, 2006, entitled Noise resistant edge detection, by Xing Li, describes an edge detection method which involves eliminating pixels that have erroneously been classified as edges prior to image processing.

BRIEF DESCRIPTION

In accordance with one aspect of the exemplary embodiment, a method for registering source and target images includes receiving a first source image and receiving a first scanned image. The first scanned image is one that has been generated by scanning a printed page that has been generated by printing the first source image or a transformed first source image derived from the first source image. Locations of corners of a target image in the first scanned image are identified. With a first computed transform, the corners of the target image in the first scanned image are aligned to corners of the first source image to generate an aligned target image. Local features in the source image and aligned target image are detected. A second transform is computed to align the target image with the first source image, based on the detected local features.

One or more (or all) of the steps of the method may be performed with a processor.

In accordance with another aspect of the exemplary embodiment, a registration component for registering source and target images includes memory which stores instructions for receiving a first source image, receiving a first scanned image, the first scanned image having been generated by scanning a printed page that has been generated by printing the first source image or a transformed first source image derived therefrom, identifying locations of corners of a target image in the first scanned image, aligning the corners of the target image in the first scanned image to corners of the first source image with a first computed transform to generate an aligned target image, detecting features in the source image and aligned target image, and computing a second transform to align the target image with the first source image, based on the detected features. A processor, in communication with the memory, executes the instructions.

In accordance with another aspect of the exemplary embodiment, a method for registering source and target images includes receiving a first source image and a scanned image; aligning a target image in the scanned image to the first source image to generate an aligned target image; generating a first feature map from one of the first source image and the target image based on local features; generating a second feature map from the other of the first source image and the target image based on local features; identifying pixel blocks of the first feature map that include a corner feature; for each of the identified blocks, computing a correlation between local features in the identified block and local features in a first block in the second feature map; for each of a set of blocks local to the first block in the second feature map, computing a correlation between local features in the identified block and local features in the local block; identifying pairs of similar blocks based on the computed correlations; and computing a content transform to register the target image with the first source image, based on the pairs of similar blocks.

One or more (or all) of the steps of the method may be performed with a processor.

BRIEF DESCRIPTION OF THE DRAWINGS

FIG. 7 illustrates alignment of blocks of source and target images in the method of FIG. 5.

DETAILED DESCRIPTION

A system and method are provided which enable registering a scan of a printed "target" image to a corresponding original electronic source image from an image path. The exemplary method uses a combination of alignment of a target image, in the scanned image, to the source image, followed by alignment of local features in the source and target images. The method is able to run in real-time on a sequence of customer source images.

The method allows improved registration between scanned and source images, which enables finer tuning of defect detection algorithms.

Figure 1:
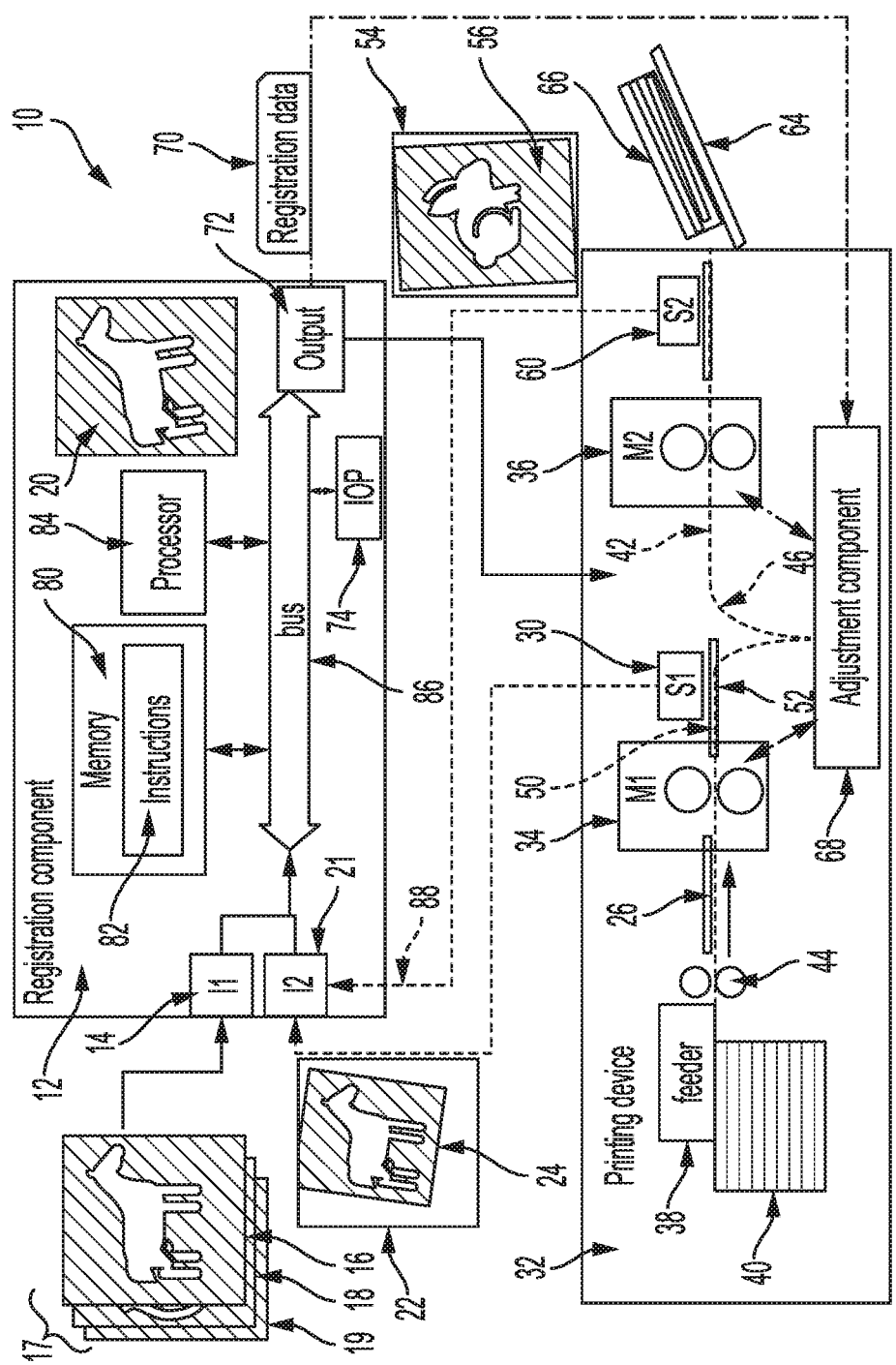
FIG. 1 is a functional block diagram of an image processing system including a registration component, in accordance with one aspect of the exemplary embodiment.

With reference to FIG. 1, an image processing system 10 includes a computer-implemented registration component 12. The registration component 12 includes a first input device (I1) 14, which receives a digital page image (source image) 16, including content to be rendered (i.e., the source image is not entirely blank).

A "source image" generally may include information in electronic form which is to be rendered on the print media by the image forming device and may include text, graphics, pictures, and the like. The content of the source image may be defined by an array of pixels of different colors (or monochrome shades of grey). Thus, the system and method are applicable to a sequence of at least two, or at least three, or more different customer source images forming a document or set of documents to be printed. The exemplary source image 16 is thus one of a sequence 17 of multiple source images 16, 18, 19 to be printed, each one comprising different image content. The exemplary source images 16, 18, 19 used herein are all customer source images, i.e., they are not calibration images. Calibration images are specifically predesigned with fiducial marks for conventional image on paper registration. The locations of the fiducial marks, e.g., crosses, bullseyes, or the like, relative to the corners of the page, are known, prior to printing. In contrast, a source image lacks such fiducial marks.

A "transformed source image" 20 is an image generated from the source image, either by the registration component 12 or by another component of the system, as described in greater detail below.

The registration component 12 also includes a second (or the same) input device (I2) 20, which receives a full-width scanned image 22. The scanned image 22 includes a target image 24. The scanned image 22 is generated by printing the digital source image 16 (or a digital source image 20 derived therefrom) on one or more sheets 26 of print media to form a printed page 28 and scanning the printed page with an associated scanner (S1) 30. Each printed page of a print job 17 is automatically scanned to generate a respective scanned image. The target image 24 in the scanned image 22 generally corresponds to the source image 16, but may be rotated, shifted in x and/or y directions, and/or enlarged or reduced in size. As a result, the target image 24 may correspond to less than the complete source image 16/transformed image 20, in some instances.

The system 10 may include or be associated with at least one printing device 32. The printing device 32 renders the source image 16 and/or a transformed digital image 20 generated from the source image, on a sheet 26 of print media. In general, the printing device 32 renders a sequence 17 of different customer source images on respective paper sheets.

Each printing device 32 includes at least a first marking engine 34, which applies an image on the sheets 26 of print media, using a marking material, such as inks or toners, to form at least one side of the printed page 28. The first marking engine 34 may be configured for duplex printing (printing on both sides of the same sheet) and/or a second marking engine 36 may be provided which prints on the opposite side of the print media sheets to the first marking engine. A feeder 38 supplies the print media from a print media source 40 to a paper path 42 connected with the first and second (where used) marking engine(s) 34, 36. A conveyor system 44 conveys the sheets singly along the paper path 42. The conveyor system 44 may include rollers, conveyor belts, or other components for conveying the printed sheets in a downstream direction. An inverter 46 may be included in the paper path for inverting sheets between printing of forward and reverse sides.

The printing device 32 can include any device for rendering an image on print media, such as a copier, laser printer, bookmaking machine, facsimile machine, or a multifunction machine (which includes one or more functions such as scanning, printing, archiving, emailing, and faxing). "Print media" can be a usually flimsy physical sheet of paper, plastic, or other suitable physical print media substrate for images. The operation of applying images to print media, for example, graphics, text, photographs, etc., is generally referred to herein as printing or rendering.

The scanner 30, which may be a full-width in-line scanner, is positioned adjacent the paper path 42 to scan the printed pages 28 and provide scanned images 22 thereof to the registration component 12. In some cases, where the marking engine 34 is configured for duplex printing, the scanner 30 scans both sides 50, 52 of each printed sheet to produce first and second side digital scanned images 22, 54, with respective target images 24, 56. In this embodiment (not shown), a return loop may return the printed and scanned page 28, via an inverter, to the marking engine 34, for printing the second side 52. The second side 52 is then scanned by the same scanner 30 to produce the scanned image 54 of the second side of the printed page 28. In other embodiments, as illustrated in FIG. 1, first and second scanners (S1, S2) 30, 60 scan the front (first) and reverse (second) sides 50, 52 of the printed sheet 28, respectively. The second scanner 60, in this embodiment, may be configured similarly to the first scanner 30 and be positioned adjacent the paper path 42, downstream of the second marking engine 36, to scan only the second sides 52 of the printed sheets 28. In yet another embodiment (not shown), a single scanner, in the position of scanner 60, downstream of the first and second marking engines 34, 36 scans both sides of the sheet, e.g., by returning the sheet 28, via a return loop which includes an inverter, to the scanner after scanning the second side. In this embodiment, the first scanner 30 can be omitted.

An output device 64, such as a tray, positioned downstream of the marking engine(s) 34, 36 and scanner(s) 30, 60, outputs the printed pages 28, e.g., as a stack 66 of printed pages. As will be appreciated, the printing device 32 may include additional components, such as one or more of a stacker, stapler, bookbinder, user interface, controller, and the like.

In one embodiment, the printing device 32 may include or be in communication with an adjustment component 68, which is configured to adjust printer settings for improved registration, based on the output of the registration component 12. For example, registration data 70, generated by the registration component 12, may be output by an output device 72 to the adjustment component 68. In another embodiment, the registration component 12 may feed registration data 70 to a second registration component 74, which is configured to use a different method for image-on-paper (IOP) registration, e.g., using a standard calibration image.

The illustrated registration component 12 includes memory 80, which stores software instructions 82 for performing some of the steps of the method, which is described in more detail with reference to FIG. 2. A processor 84, in communication with the memory, executes the instructions. As for the registration component, although not illustrated, the adjustment component 68 may also include memory storing instructions for adjusting printer settings and a processor, in communication with the memory, for executing the instructions. In another embodiment, the registration component and adjustment component may be combined. Hardware components 14, 20, 30, 60, 32, 68, 72, 80, 84, of the system 10 may communicate via one or more of a data/control bus 86 and wired or wireless links 88.

As will be appreciated, the registration component 12 may be located in or on the printing device 32 or be incorporated in, or include, a remote computing device, such as a print server, laptop, or other computer device. The registration component 12 may include one or more computing devices, such as a PC, such as a desktop, a laptop, palmtop computer, portable digital assistant (PDA), server computer, cellular telephone, tablet computer, microprocessor, combination thereof, or other computing device capable of executing instructions for performing the exemplary method.

The memory 80 may represent any type of non-transitory computer readable medium such as random access memory (RAM), read only memory (ROM), magnetic disk or tape, optical disk, flash memory, or holographic memory. In one embodiment, the memory 80 comprises a combination of random access memory and read only memory. In some embodiments, the processor 84 and memory 80 may be combined in a single chip. Memory 80 stores instructions for performing the exemplary method as well as the processed data 70. In addition to performing registration, other steps in an image processing pathway may also be performed by component 12. These may include, for example, background suppression, color conversion to a different color space, and the like.

The input/output interfaces 14, 20, 72 allow the registration component to communicate with other devices via a computer network, such as a local area network (LAN) or wide area network (WAN), or the internet, and may comprise a modulator/demodulator (MODEM) a router, a cable, and/or Ethernet port.

The digital processor device 84 can be variously embodied, such as by a single-core processor, a dual-core processor (or more generally by a multiple-core processor), a digital processor and cooperating math coprocessor, a digital controller, or the like. The digital processor 84, in addition to executing instructions 82 may also control the operation of the printing device 32.

The term "software instructions," or simply "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
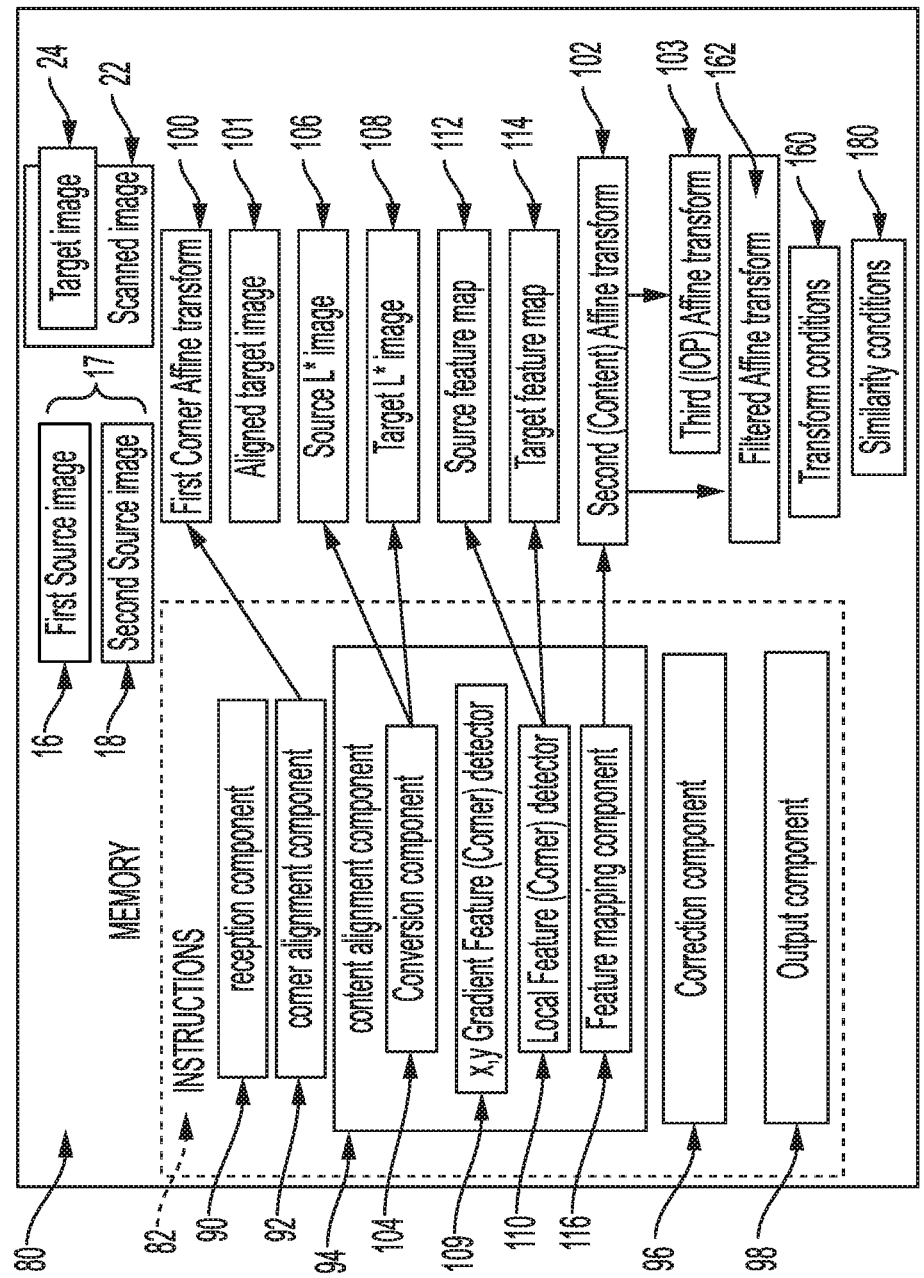
FIG. 3 is a functional block diagram of components of the registration component of FIG. 1.

As illustrated in FIG. 3, the software instructions 82 may include a reception component 90, a corner alignment component 92, a content alignment component 94, an optional correction component 96, and an output component 98. The reception component 90 receives and stores the source image(s) 16, 18, 19, etc., and scanned page(s) 22, 54 to memory, such as memory 80. The source image(s) 16, 18, 19, etc., may be received from a customer device (not shown), such as a computer, memory storage device, or the like.

The corner alignment component 92 detects the four corners of the target image 24 within the scanned image 22, and aligns the detected corners with those of the source image 16, e.g., by generating an optimum corner transform 100, such as an affine transform, for achieving the alignment. The output may be an aligned target image 101 of the same size (in pixels) as the source image 16.

The content alignment component 98 detects local features in the aligned target image 101 and source image 16 and computes an optimum content affine transform 102 for mapping the target image to the source image (or vice versa), based on the detected local features. The content alignment component 94 may include a conversion component 104, which converts the aligned source and target images 16, 101 to lightness images 106, 108. In one embodiment, a gradient feature detector 109 detects x,y gradient features in the lightness image 106 (or original source image 16). These are features with high gradients in two (e.g., perpendicular) directions, such as Harris corners, The gradient feature detector 109 may also detect x,y gradient features in the target lightness image 108 (or target image 101). This allows the search for local features to be focused on regions of the source and target images that include an x,y gradient feature. A local feature detector 110 extracts local features (e.g., gradients in x and/or y directions, such as corners/edges) from the lightness images 106, 108 to generate feature maps 112, 114 for the aligned source and target images 16, 101. A feature mapping component 116 maps corresponding local features of the feature maps 112, 114 (specifically, local features in blocks that contain an x,y gradient feature) to identify an optimal content affine transform 102 for aligning the content of the aligned source and target images 16, 101.

In one embodiment, the correction component 96 applies the computed affine transform 102 to a subsequent (or the same) source image (or image generated therefrom) to generate a transformed source image 20. As will be appreciated, the computed affine transform 102 may be inverted when applied to the source image. In another embodiment, the correction component 96 may feed the transform 102 to a second registration component 74, which generates a third (IOP) transform 103, such as an affine transform or set of calibration parameters, which is then applied to a source image 16, 18.

In one embodiment, the output component 98 sends the transformed source image 20 to the printing device 32 for printing. Alternatively, or additionally, the output component 98 outputs registration data 70 (based on the computed transform 102) to the adjustment component 68 of the printing device, which may be used to make adjustments to one or more printing device components, such as the feeder, marking engine(s) and the like.

The affine transforms 100, 102 may each be in the form of a matrix which causes each pixel in the source image 16 (or a subsequent source image 18, 19, etc.) to be displaced by a respective amount in x and y directions. The affine transforms 100, 102 are able to handle translation rotation, scaling and shear of images. An "affine transformation" is a coordination transform between two affine spaces which includes a linear transformation followed by a translation. To be able to create, enable, and apply affine transformations, the individual data points used to compute the transform or which are to be transformed, are converted to affine form. The use of homogenous coordinates allows affine transformations to be easily represented by a matrix in affine form. An affine matrix transformation K from a first set $P_1$ of points to a second set $P_2$ of points, according to $KP_1=P_2$, where $K=P_2P_1^T$, and $P_1^T$ is the pseudo inverse of $P_1$ (i.e., $P_1P_1^T=1$, with an insignificant numerical error). Given a first set of points $P_1=p_{1-1}, p_{1-2}, \ldots p_{1-n}$, such as the computed corners of the target image 24, and a second set of points $P_2=p_{2-1}, p_{2-2}, \ldots p_{2-n}$, such as the corners of the source image 16, the optimum value of K which maps point $p_{1-1}$ to point $p_{2-1}$, and so forth, for all points, is identified, e.g., as the minimum mean square error between each pair of source and target of points.

For example, if the target image 24 is smaller than the source image 16, it may be expected that pixels near the edges of the source image would need to be displaced more than those near the center of the source image, by the transform 102, in order to generate a printed image which is more closely registered with the source image. The computed affine transform matrices 100, 102 enable transforming any x,y coordinate between scan and source (or source and scan using the inverse).

In one embodiment, an inverse of the transform 102 generated from the customer source image 16 and target image 24 can be input to the IOP component 74 to generate a simulated scan of a calibration image. The IOP measurements on the simulated scan can be fed back to an IOP setup routine to calculate a third transform, such as correction parameters, for improved registration of a subsequent source image 18.

Figure 2:
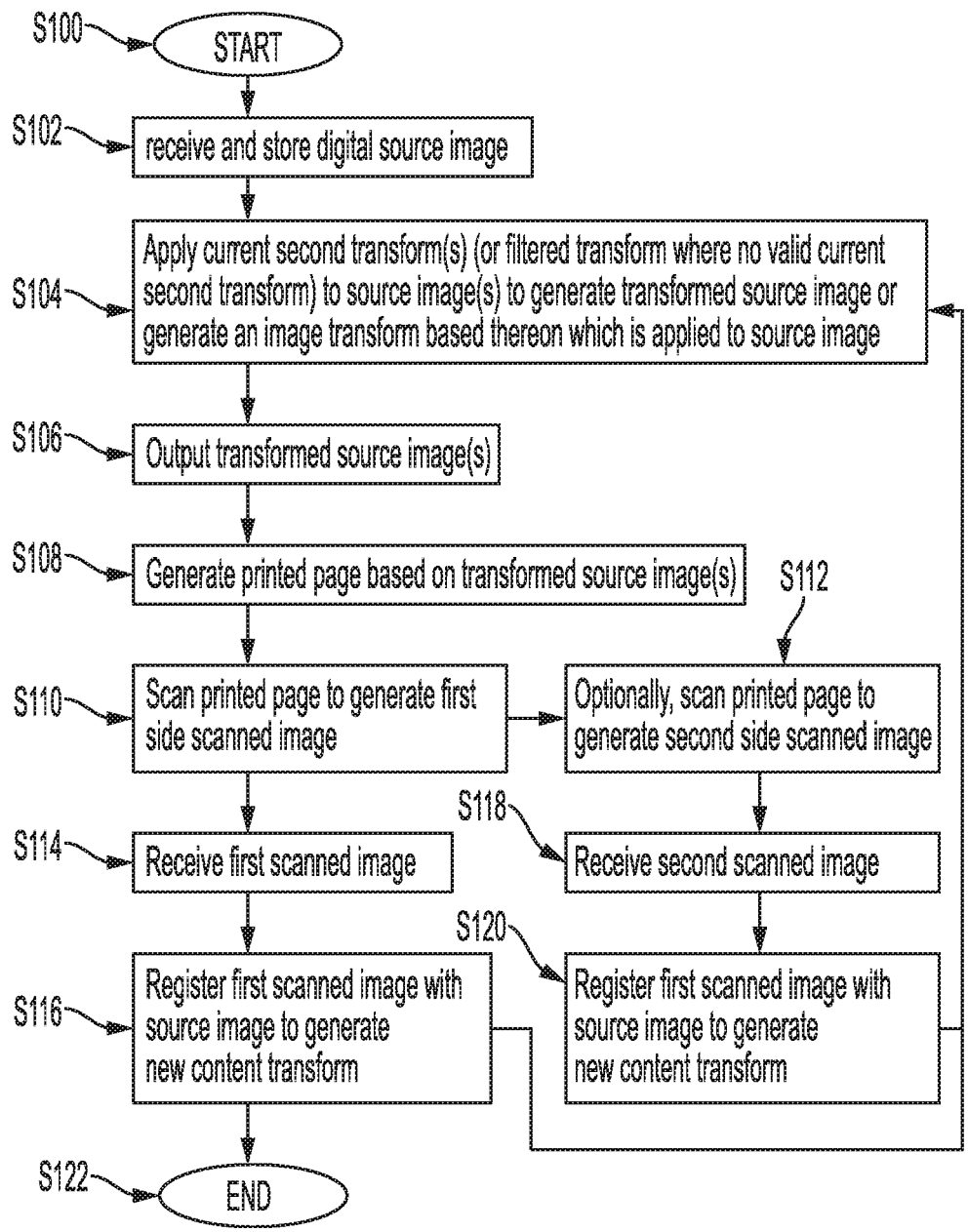
FIG. 2 is a flow chart illustrating a registration method in accordance with another aspect of the exemplary embodiment.

With reference now to FIG. 2, an image processing method is illustrated, which may be performed with the system of FIGS. 1 and 3. The method begins at S100.

At S102, a first source image (page image) 16 is received by the registration component 12 and stored in memory 80. The source image 16 has the same dimensions as the nominal dimensions of the print media sheets 26, e.g., the sheets of paper on which the source image (or a transformed image page 20 derived therefrom which has similar content), is to be printed. The nominal dimensions of print media sheets may vary slightly from the actual sheet dimensions, e.g., vary by no more than 2%, or no more than 1% of the actual sheet dimensions in each of the length and width dimensions.

At S104, a transformed source image 20 is generated with a second transform, if available. Details on the generation of the transform are described below.

At S106, the optionally-transformed image 16 is output by the output component 98.

At S108, a printed page 28 is generated, by the printing device 32, by rendering the (optionally transformed) source image 16 on a first side 50 of a sheet 26 of print media. As will be appreciated, the source image 16 may undergo various image processing steps prior to being sent to the printing device 32. Similarly, a second (optionally-transformed) image may be rendered on a second side 52 of the sheet 26 of print media by the printing device 32.

At S110, the first side 50 of the printed sheet 28 is scanned by the first scanner 30 to generate a first scanned image 22 of the printed page 28.

Optionally, at S112, the second side 52 of the printed sheet 28 is scanned by the first scanner 30 or by the second scanner 60 to generate a second scanned image 54 of the printed page 28.

At S114, the first scanned image 22 is output by the scanner 30 and is received by the reception component 90 and stored in memory 80 (or in external memory accessible to the registration component 12).

At S116, registration of the scanned image 22 to the (first) source image 16 is performed to generate a transform 102. Briefly, this includes identifying the position of the target image 24 in the scanned image 22 (which in some cases may not be entirely located within the scanned image), aligning the target image 24 to the source image 16 to compute a first (corner) transform 100, and aligning local features of the aligned images 16, 101 to compute a second (content) transform 102. The second (content) transform 102, if validated, may be used for subsequent source image transformations or input to an image on paper registration system to modify a calibration image or set of fiducials. The registration may be performed as described below and illustrated in FIGS. 4 and 5.

The method may then return to S104, where the new second transform 102 generated at S116, if validated, is considered as the current transform for the next (or, more generally at least one subsequent) source image 18 to be printed on a first side of a sheet. Specifically, in one embodiment, if a current transform 102 is available from the previous iteration, the current transform 102 (or a third transform 103 generated therefrom) is applied to the current source image 18 to generate a transformed source image 20 (with the aim of reducing the registration errors between the corresponding scanned image and that source image) in the same manner described for the first source image 16. In the case where there is no valid current second transform, a filtered transform may be used as the second transform. In some embodiments, the second transform 102 is sent to the IOP component 74, which uses it to generate a third transform 103, which is applied to the source image to reduce alignment errors for subsequently printed pages.

Similarly, in a next iteration, the second transform 102 generated for source image 18 is used to transform source image 19, and so forth, assuming that the transform 102 generated in the prior iteration is determined to be valid (otherwise, a new filtered transform is used). The method may thus proceed through multiple iterations (e.g., at least two, or at least three, or at least four iterations) of S104-S116. At each iteration, a new customer image is used as the current source image, until no more (first side) source images are to be printed.

In some cases, where multiple copies of the same source image 16 are to be printed, the transform 102 may be applied to the same source image prior to printing subsequent copies.

In some embodiments, the transform 102, or registration data 70 based thereon, may be sent to the adjustment component 68 of the printing device, which makes adjustments to components of the printing device that are anticipated to reduce alignment errors for subsequently printed pages.

As will be appreciated, for each digital source image received at S102, a previously-generated transform may be applied, prior to printing. In a first iteration, where no prior transform is available, the source image may be generated without applying a transform, or using a transform generated on a similar device or on the same printing device at some earlier time, or with a different type of paper.

In the case where the paper is duplex printed, the second side scanned image 54 may be similarly registered with its source image. Thus, where S112 has been performed, at S118 the second scanned image 54 is output by the scanner 60 and is received by the reception component 90 and stored in memory 80 (or in external memory accessible to the registration component 12), in the same manner as for the first scanned image 22.

At S120, the second side scanned image 54 is independently aligned to its respective source image to generate a second content transform (not shown), as described for S116 which can be used to register subsequent second side images at S104.

In the case of duplex printing, the method may proceed through multiple iterations (e.g., at least two, or at least three, or at least four iterations) of S104-S120. At each iteration, a new customer second side image is used as the current (second side) source image, until no more second side source images are to be printed.

In some embodiments, to reduce registration errors between front and back sides of the same sheet (e.g., to minimize the effects of show through), the second side scanned image 54 may additionally or alternatively be registered with the transformed first side source image.

The method ends at S122, e.g., when the paper in the printer is changed to a different type of print stock or when other terminating event occurs.

Figure 4:
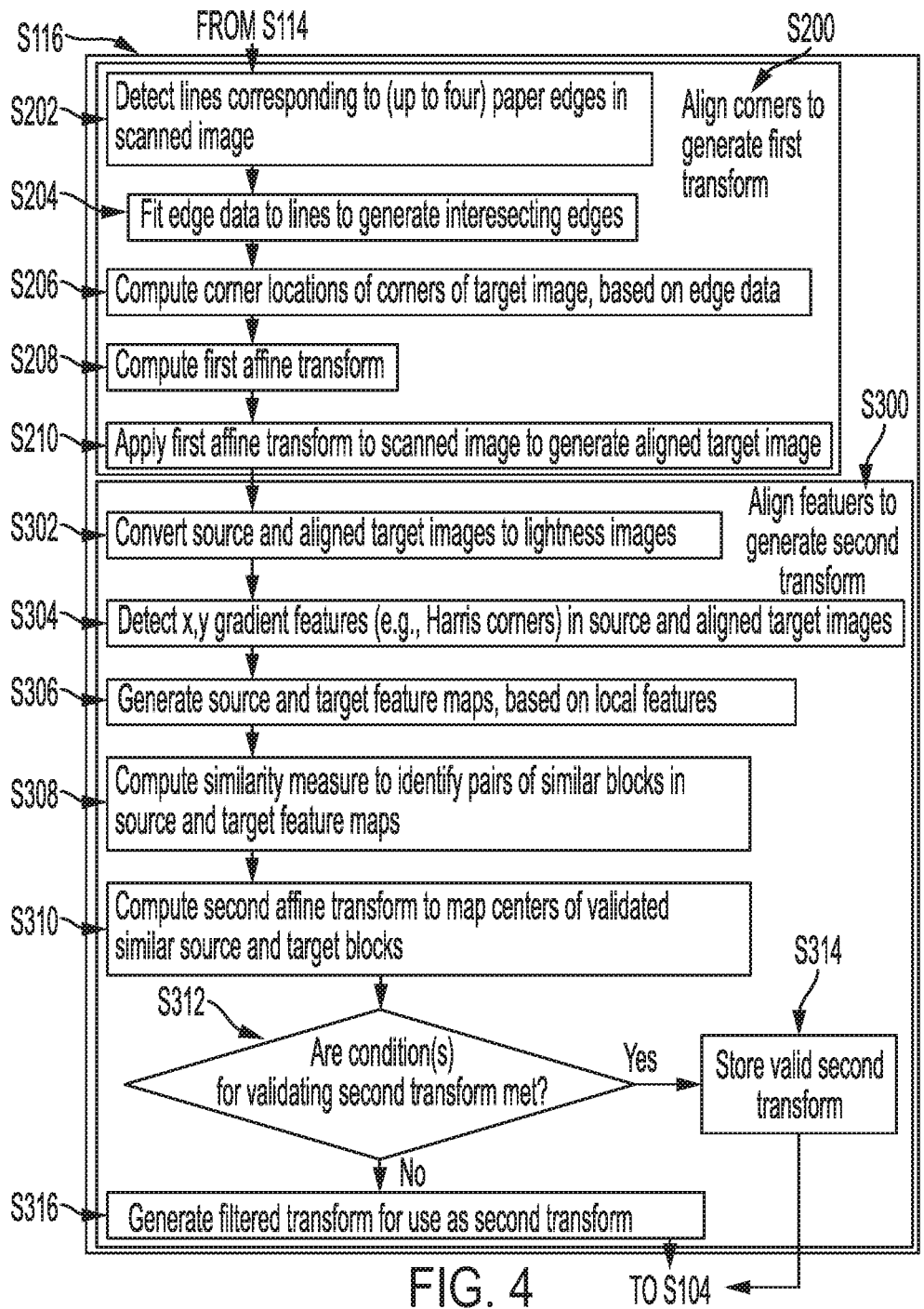
FIG. 4 is a flow chart illustrating a part of the registration method of FIG. 2.
Figure 5:
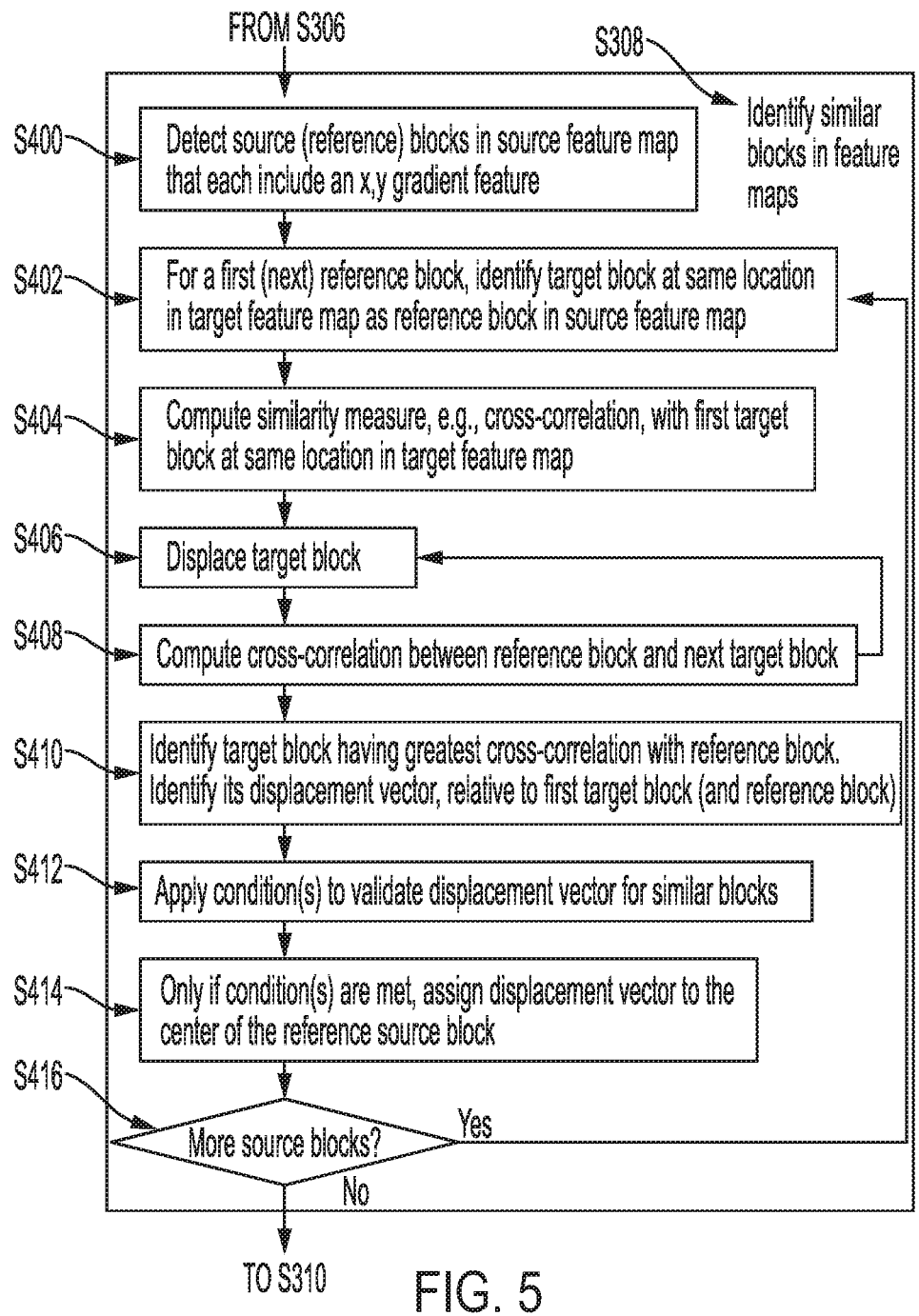
FIG. 5 is a flow chart illustrating a part of the registration method of FIG. 3.

With reference to FIGS. 4 and 5, the registration (S116, and similarly for S120) may proceed in two main steps S200 and S300, as follows.

Figure 6:
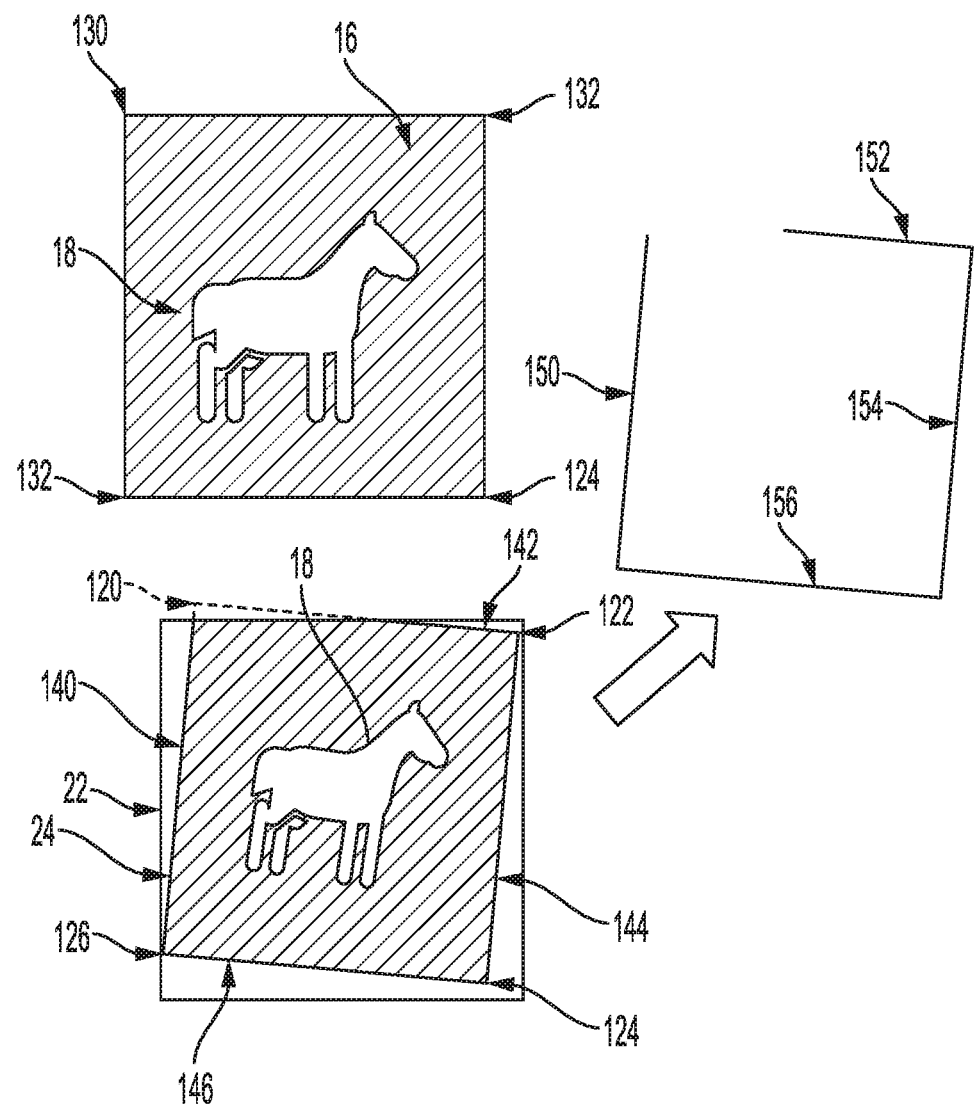
FIG. 6 illustrates alignment of corners of source and target images in the method of FIG. 2.

At S200, the target image 24 is located in the scanned image 24 and the target image is aligned with the source image using a computed transform 100. In particular, corners 120, 122, 124, 126 of the target image 24 in the first scanned image 22 (FIG. 6) are aligned to the corresponding corners 130, 132, 134, 136 of the source image 16, by the corner alignment component 92 to generate an aligned target image 101 of the same pixel dimensions as the source image 16. This may include the following substeps:

At S202, for identifying the four edges 140, 142, 144, 146 (FIG. 6) of the target image (corresponding to the edges of the paper sheet) in the scanned image 22, (up to) four lines 150, 152, 154, 156, corresponding to the most likely edges of the target image 24 are detected. The lines may or may not be connected to each other at their ends, but generally include parts or all of the lead edge, trailing edge, and inboard and outboard edges of the scanned page. As will be appreciated, depending on the position of the target image 24 on the scanned image 22, one or more of the corners (such as corner 120 illustrated in FIG. 6), and part of one or more of the edges 140, 142, 144, 146, may lie outside of the scanned image 22. To identify the lines 150, 152, 154, 156, a simple thresholding function may be applied to each scan line in the scanned image to determine the transition between the dark background and the bright light color of the paper target 24. For each scan line, one or more of these transition points is identified. A linear fit (with outlier rejection) is applied to the identified points to identify the lines. See, for example, above-mentioned U.S. Pub No. 20060165292 for a suitable edge detection method.

At S204, paper edge data is fitted to the lines 150, 152, 154, 156. This includes extending the four lines to their estimated full lengths and determining their intersections to compute four edges 140, 142, 144, 146.

At S206, the four corners 120, 122, 124, 126 are computed from the four edges 140, 142, 144, 146.

At S208 an optimal affine transform 100 is computed to map the four paper corners 120, 122, 124, 126 of the paper target 24 in the scanned image 22 to the four corners 130, 132, 134, 136 of the electronic source image 16 (or vice versa). It should be noted that the computation of the first affine transform 100 relies only on the coordinates of the detected corners (in affine space), i.e., an optimal transform of (a maximum of) four points to four points. There is no attempt to locate local features within the boundaries of the source and target images at this stage.

At S210, the first affine transformation 100 is applied to the scanned image 22. The aligned target image 101 in the scanned image now has same dimensions as the source image 16 (nominal paper size). Alternatively, an inverse of the affine transform 158 is applied to the source image to bring the target and source images into alignment. The method then proceeds to S300.

At S300, local features in the source image are aligned to corresponding local features in the aligned target image 101, by the content alignment component 94 to generate a content transform 102. This may include the following substeps:

At S302, in one embodiment, the source and target images 16, 101 are converted to a common color space, e.g., a device-independent color space, such as CIE L*a*b*, or greyscale, by the conversion component. In particular, lightness (single channel) images 106, 108 are generated from the source image 16 and aligned target image 101, respectively. Only the lightness component L* of the images 16, 101 is thus employed in the following steps, in the exemplary embodiment. In some cases, where the scanner(s) 30, 60 have a single channel output, the conversion is not needed. In other embodiments, the local feature alignment may be performed on color images, such as RGB images.

At S304, the gradient feature detector 109 is applied to all (or at least a subset) of the pixels in the target and source lightness (e.g., L*) images 106, 108 to identify x,y gradient features, such as corners or other artifacts, which occur where there is a rapid change in lightness in two or more directions from a given pixel. Detection of edges (a rapid change in lightness in one direction only) is less useful for this step. An exemplary feature detector is a corner detector, which seeks to identify pixels at the junction of two edges, where an edge is indicated by a sudden change in image lightness L*. The corner detector may be a Harris Corner detector, as described in C. Harris and M. Stephens, "A Combined Corner and Edge Detector," Proc. 4th Alvey Vision Conference, pp. 147-151 (1988). In one embodiment of the Harris Corner detection algorithm, two edge detectors (e.g., Sobel operators) are applied to patches of the reference image to calculate the local image gradient in both x and y directions, denoted $I_x$ and $I_y$, respectively. A 2×2 structure tensor M is generated from locally averaged values of $I^2_x$ and $I^2_y$, and $I_x \times I_y$. The Harris metric f is calculated by: det(M)−k×trace(M) for each pixel. A large value of f indicates the presence of a major feature (a Harris corner), and thus a good feature to match. For example, all pixels above a predetermined threshold of f are identified and/or a preset maximum number of pixels having the highest values of f is identified, such as the 100 pixels with the highest value of f. As will be appreciated there are other algorithms available for detection of Harris corners, where the local image gradient is high in both x and y directions.

Other corner detectors may alternatively be used, such as a Harris-Laplace Corner Detector. Other feature detectors may also be used, such as those which rely on detection of color changes as well as gradient, e.g., salient feature detectors. Speeded Up Robust Features (SURF) detectors, Scale Invariant Feature Transform (SIFT) detectors, could also be used. However, the simplicity of the Harris Corner detector makes it particularly suitable for this purpose. To allow affine transform computation, at least three points corresponding to x,y gradient features are needed. However, for robustness, a larger number of points (x,y gradient features) is identified, such as at least 5, or at least 10, or at least 20, such as up to 1000, or up to 100, or up to 50 features are identified in S304.

At S306, a feature map 112, 114 is computed from the source and target lightness images 106, 108. The feature map 112, 114 includes local features, such as edge features. This may be achieved by the local feature detector 110, e.g., an RSS (root sum squares) horizontal and vertical edge (Sobel operator) detector or other edge detector. The Sobel operator computes, for each pixel, a measure of the gradient in x and y directions, respectively, denoted $S_x$ and $S_y$. The operator combines these to generate a single edge strength by calculating the square root of the sum of the squares: Edge strength=$\sqrt{Sx \times Sx + Sy \times Sy}$. In one embodiment, the edge strength values may be thresholded so that only pixels which meet or exceed a threshold are assigned an edge strength value (considered as a local feature) in the feature maps.

Where the source and aligned target images 16, 101 are used instead of lightness images 106, 108, the feature map 112, 114 may be computed from the source and target images 16, 101.

At S308, blocks of the source feature map 112 containing x,y gradient features (as identified at S304) are compared with equal-sized blocks in the target feature map 114, at similar locations (e.g., the block centers are no more than a predetermined number of pixels apart, in x and y directions, such as no more than ±10 pixels, or ±8 pixels apart). The aim is to identify source and target blocks with a threshold degree of similarity, based on the identified local features that they contain. S308 is described in further detail below, with reference to FIG. 5.

At S310, a second transform 102 is computed, based on the locations of the identified pairs of blocks in the feature maps. The second transform 102 may be an optimum affine content affine transform 102 to map centers of those source blocks 124 in the source feature map 112 with valid displacement vectors to their new locations 128 in the target feature map 114 (or vice versa).

At S312, one or more conditions 160 may be applied before validating the transform 102. For example, one or more of the following set of conditions 160 may be applied.

A. There are at least 15, or at least 20, or at least 30 pairs of similar blocks to provide points (block centers) for computing the transformation (10 times degrees of freedom).

B. The points (block centers) of the 15 or more pairs of similar blocks span sufficient x and y and are not colinear (e.g., a minimum of x and y point range is greater than 10% of the nominal paper size in that direction with absolute value of x,y correlation less than 0.75).

C. The transformed corners of the paper 101 move no more than a threshold number of pixels, e.g., no more than 16 pixels (max of x or y).

D. The mean residual errors of the 15+ target points (target estimates from affine fit vs actual) are small (e.g., below a threshold). This can be determined from covariance matrix singular values.

E. The affine transformation computed is near to identity—this avoids small amounts of mag, rotation and shear.

It may be noted that an affine transform 102 is not applicable in all instances, for example when steering problems in the scanner result in rotation or other non-linear movement of the image as it passes through the scanner. Pixels of the target image 24 may be also be shifted to different extents from their corresponding pixels in the source image 16, for example due to the sheet 26 warping or shifting during printing of the source image. Providing a set of conditions 160, such as those listed above, helps to limit the likelihood that an affine transform is a poor fit for the data.

If at S312, the condition(s) 160 is/are met, then at S314, the affine transform 102 is stored in memory 80, e.g., for use by the correction component 96.

At S316, a filtered affine transform 162 may be maintained for use when a current transform 102 is not found valid at S312. The filtered affine transform 162 may be based on one or more previously-generated valid transforms 102. For example, an infinite impulse response (IIR) filtered affine transform 162 may be computed, based on two or more affine transforms 102. E.g., each time a valid transform 102 is computed, a filtered affine transform 162 is also computed as ((0.8×prev)+(0.2×current)), where prev is the previously stored filtered affine transform 162 or previous valid affine transform 102, and current is the latest valid affine valid transforms 102. The filtered affine transform 162 can then be used when the measured transform 102 for the current page is not valid.

The method then proceeds to S104 (FIG. 2), when the affine transform 102 (or filtered affine transform 162, if there is no valid current second transform) is used to generate a transformed source image 20 for a (next) source image 18.

With reference to FIG. 5 and also to FIG. 7, which shows portions of the source and target feature maps 112, 114, S308 may include the following substeps.

At S400, the source feature map 112 is considered as an array of non-overlapping pixel blocks 170, 172, 173, etc. of equal size. The blocks can be of size N×N pixels, where N is at least 2, or at least 3, such as up to 40 or up to 20 (e.g., 16×16 pixel blocks). The source feature map 112 may contain at least 100, or at least 1000 of such blocks. Pixel blocks 170, 172, 173, etc., in the source feature map 112 that each contain at least one x,y gradient feature 174, such as a Harris corner (e.g., at least one pixel in the block with a Harris corner metric f greater than a threshold) are identified as source reference blocks. This may include identifying all or at least some of the blocks in the feature map 112 meeting the threshold. Blocks near the edges of the feature map 112 may be ignored (e.g., selecting only those source blocks 170, 172 that can be displaced by a selected number of pixels in x and y directions). The source blocks in the source map may also be filtered to exclude source blocks containing an x,y gradient feature for which there is no corresponding target region in the target feature map 114 that also includes an x,y gradient feature. The target region may be larger than the source block, e.g., a 32×32 region with the same center as the source block. For example, as shown in FIG. 7, the source block 173 includes an x,y gradient feature 174, but the corresponding region 175 of the target feature map 114 does not. Source block 173 can thus be filtered out from the set of reference blocks and is not considered further. As an alternative to, or in addition to, filtering the source blocks at this stage, a condition may be applied during validation of reference blocks (see below).

For each identified source reference block 170, 172 that meets the requirements above (e.g., as shown for block 170), at S402, a corresponding first target block 176 of the same pixel size (16×16) at the same x,y location in the target feature map 114 is identified.

At S404, a similarity measure, such as a cross-correlation, is computed between the reference block 170 and the corresponding first target block 176. This may include, for each pixel in the reference block, computing a function (e.g., product or absolute difference) of the local feature value (e.g., edge value) for the pixel and the corresponding pixel of the (first) target block. The results are then aggregated, e.g., as a sum of the products or differences. In the case where the blocks are 16×16 pixels, this includes summing 256 products (or differences) to generate the cross correlation. The cross correlation may be normalized, e.g., to a value in a range of 0-100%.

At S406, the first target block 176 is displaced in x and/or y directions to a new position, e.g., the second target block shown at 178.

At S408, S404 is repeated, i.e., a cross-correlation between the blocks 170, 178 is computed.

Steps S406 and S408 are repeated, for a predetermined number of displacements, e.g., shifting the first target block in 1 pixel increments up to a maximum displacement −8/+7 pixels in both x and y directions (a total of 256 displacement vectors for each reference block 170).

At S410, for each reference block 170, the scan displacement vector corresponding to the target block 178 with the maximum cross-correlation is identified.

At S412, a set of one or more validation conditions 180 may be applied before validating a pair of points which correspond to the reference block 170 and the target block with the highest cross-correlation. The conditions 180 may be selected from the following:

A. The target block 178 with the maximum correlation includes at least one identified x,y gradient feature 182 (analogous to x,y gradient feature 174). For example, a maximum Harris metric f for the 16×16 target block 178 exceeds a threshold value, i.e., at least one pixel 182 in the target block 178, exceeds the threshold value.

B. The cross-correlation coefficient of the source reference block 170 and the matching target block 178 exceeds a threshold value, e.g., is greater than 80%, or is greater than 90% (on a scale of 0-100%).

C. The cross-correlation drops by at least a threshold amount for at least a threshold number of neighboring displacement vectors, e.g., drops by at least 10% in seven of the eight closest neighboring vectors.

D. The displacement is not the maximum (−8/+7) for x and/or y (i.e., the target block 178 is not at the edges of the target feature map 114. This avoids validating local maxima.

If at S412, each of the set of validation conditions 180 is met, then at S414, the displacement vector for the target block is validated and assigned to the reference source block 124. The source and target blocks, in this case are then considered as a validated pair of similar blocks. Otherwise, the displacement vector for the source block 170 is ignored and no validated pair of similar blocks is identified.

If at S416, there are remaining feature-containing source blocks which have not yet been considered, the method returns to S402, when a second (or subsequent) source block 172 is considered as the reference block. Otherwise, the method proceeds to S310.

As will be appreciated, rather than selecting a source block 170, 172 as the reference block, and identifying a target block 178, if there is one, which meets the conditions 180, in another embodiment, an x,y gradient feature-containing target block may be selected as the reference block and displacements of a corresponding source block may be performed in a manner as described above for the target block.

The method then proceeds to S310, where the second transformation 102, is generated as the optimum transformation over all the displacements for the validated pairs of similar blocks.

The registration method described above may produce alignment errors on the order of 1-2 pixels (at 150 dpi) per page. However, this is well within the 1 mm specifications of many existing automatic alignment methods. Averaging of the errors across many sheets will reduce the error further.

The affine transform 102 may be applied (at S104) to the next source image 18, prior to printing. In this embodiment, the inverse of the transform 102 is applied to each pixel (or at least a subset of the pixels) in the source image 18 to generate a transformed image (analogous to image 20) which is sent for printing. Alternatively, the affine transform 102 may be used, by the IOP component 74, to generate a simulated calibration scan which is used to compute registration errors. This may include transforming coordinates of set of key marker points on a calibration image to generate simulated calibration scan Based on the computed registration errors, the next source image 18 can be transformed, prior to printing, to generate the corresponding transformed image.

The affine transform 102 may be applied in coordinate space or in image transformation. In coordinate space, it may be used to transform center coordinates of reference objects in the source space to expected post-print object locations. The reference objects (e.g., paper corners) may be detected in the source image by an automatic image on paper (IOP) process. In the image transform space, the transform 102 is applied to the IOP setup electronic calibration page to produce a simulated 2-D scan, which can then be used to generate a third (IOP) transform 103, such as a set of calibration parameters, for generating the transformed source image 20.

Depending on the required inputs for the IOP process used, one of the two simulated output types (image or coordinates) can be supplied to the IOP setup algorithm that provides parameters needed for generating images correctly registered to paper.

In an IOP process, the computed affine transform 102 may be used for at least one of the following:

A. Create a predicted scan of an IOP calibration page to be input to an IOP analysis program, which computes its own image transformation 103 to be applied to a new source image.

B. Transform the coordinates of desired reference objects of an IOP calibration page (e.g., corners, fiducial marks) to an expected scanned location and use those as inputs to the IOP analysis routine.

C. Detect changes in registration (i.e., changes in the affine transform matrix) and trigger a diagnostic IOP setup to ensure registration to spec values.

An advantage of one embodiment of the exemplary system and method is that if the registration changes drastically (i.e., if registration is no longer within spec) an IOP setup can be triggered. This may occur, for example, if the paper type or environment conditions change since the last IOP setup.

In other embodiments, where the registration component 12 is used alone, without additional IOP processing, the inverse of the computed affine transform 102 may be used directly to modify the source image, which is then sent to the printer.

The method may be employed on all source images to be printed. Alternatively, it is applied on some but not all source images 16, 18, 19, etc., such as every second or every fifth source image in a print queue.

The exemplary method has been found to improve performance over existing registration methods.

The method illustrated in FIGS. 2, 4, and 5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer (for example, an internal hard drive of RAM), or may be separate (for example, an external hard drive operatively connected with the computer), or may be separate and accessed via a digital data network such as a local area network (LAN) or the Internet (for example, as a redundant array of inexpensive or independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing at least a portion of the flowchart shown in FIGS. 2, 4, and 5, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for registering source and target images comprising:

receiving a first source image;

receiving a first scanned image, the first scanned image having been generated by scanning a printed page that has been generated by printing the first source image or a transformed first source image derived therefrom;

identifying locations of corners of a target image in the first scanned image;

aligning the corners of the target image in the first scanned image to corners of the first source image with a first computed transform to generate an aligned target image;

detecting local features in the source image and aligned target image; and generating a first feature map from one of the first source image and the target image based on the respective local features;

generating a second feature map from the other of the first source image and the target image based on the respective local features;

identifying pixel blocks of the first feature map that include a corner feature;

for each of the identified blocks, computing a correlation between local features in the identified block and local features in a first block in the second feature map;

for each of a set of blocks local to the first block in the second feature map, computing a correlation between local features in the identified block and local features in the local block;

identifying pairs of similar blocks based on the computed correlations; and computing a second transform to register the target image with the first source image, based on the pairs of similar blocks.

2. The method of claim 1, wherein the first source image is a customer image which lacks fiducial marks for registration.

3. The method of claim 1, wherein the method further comprises transforming a second source image with one of:
the second transform;
a third transform derived from the second transform; and
a filtered transform generated from a prior second transform for a source image prior to the first source image, when the second transform is not validated.

4. The method of claim 3, wherein the third transform is generated by applying the second transform to fiducial marks of a calibration image to generate a simulated scanned image and generating the third transform based on the simulated scanned image.

5. The method of claim 1, wherein the method further comprises applying a set of conditions for validating the second transform.

6. The method of claim 1, wherein the first and second transforms are affine transforms.

7. The method of claim 1, wherein the identifying of the locations of corners of the target image in the first scanned image comprises:
detecting lines corresponding to paper edges in the first scanned image;
fitting edge data to detected lines; and
computing corner locations based on the fitted edge data.

8. The method of claim 1, wherein the aligning of the corners of the target image in the first scanned image to the corners of the first source image comprises computing an optimum affine transform as the first transform and mapping the corners of the target image in the first scanned image to the corners of the first source image with the first transform.

9. The method of claim 1, wherein the aligned target image is the same pixel size as the first source image.

10. A method for registering source and target images comprising:
receiving a first source image;
receiving a first scanned image, the first scanned image having been generated by scanning a printed page that has been generated by printing the first source image or a transformed first source image derived therefrom;
identifying locations of corners of a target image in the first scanned image;
aligning the corners of the target image in the first scanned image to corners of the first source image with a first computed transform to generate an aligned target image;
detecting local features in the source image and aligned target image; and
computing a second transform to align the target image with the first source image, based on the detected local features,
wherein the detecting local features in the source image and aligned target image comprises:
detecting x,y gradient features in at least one of first source image and the aligned target image or in a lightness image generated from the at least one of first source image and the aligned target image;
generating a source feature map comprising local features, the source feature map being based on the first source image or the lightness image generated therefrom;
generating a target feature map comprising local features, the target feature map being based on the aligned target image or based on the lightness image generated therefrom; and
identifying pairs of similar blocks in the source and target feature maps including, for a number of iterations, computing a similarity measure between one of:
a) a reference block of the source feature map, which includes at least one of the x,y gradient features, and a set of target blocks in the target feature map and identifying one of the target blocks with the highest similarity measure; and
b) a reference block of the target feature map, which includes at least one of the x,y gradient features, and a set of source blocks in the source feature map and identifying one of the target blocks with the highest similarity measure.

11. The method of claim 10, further comprising:
applying a set of conditions to validate pairs of similar blocks in the source and target feature maps; and
wherein the computing of the second transform comprises computing an optimum transform to map centers of the validated pairs of similar blocks.

12. The method of claim 10, wherein the detected x,y gradient features comprise at least 10 features.

13. The method of claim 10, wherein the validated pairs of similar blocks comprise at least ten validated pairs of similar blocks.

14. The method of claim 10, further comprising:
partitioning the source feature map to generate a set of source blocks;
identifying source blocks in the set of source blocks that include an x,y gradient feature;
for each of the source blocks that includes an x,y gradient feature, considering the source block as a reference block.

15. The method of claim 10, wherein:
in a), the identifying a set of target blocks in the target feature map comprises:
identifying a first target block that is in a same location of the target feature map as is the reference block in the first set of blocks in the source feature map, and
identifying a set of local blocks generated by displacing the first target block in the target feature map by a respective displacement vector; or
in b), the identifying a set of source blocks in the source feature map comprises:
identifying a first source block that is in a same location of the source feature map as is the reference block in the first set of blocks in the target feature map,
identifying a set of local blocks generated by displacing the first source block in the source feature map by a respective displacement vector, and
applying a set of conditions to the target block having a highest similarity measure to the reference block and, if the conditions are met, adding the reference block and target block to a set of pairs of similar blocks.

16. The method of claim 15, wherein the second transform is computed based on the displacement vectors for the set of pairs of similar blocks and, for each pair, a center of one of the reference block and the target block.

17. A computer program product comprising a non-transitory recording medium storing instructions, which when executed on a computer, causes the computer to perform the method of claim 1.

18. A system comprising memory storing instructions for performing the method of claim 1 and a processor, in communication with the memory, which executes the instructions.

19. A registration component for registering source and target images comprising:
   memory which stores instructions for:
      receiving a first source image;
      receiving a first scanned image, the first scanned image having been generated by scanning a printed page that has been generated by printing the first source image or a transformed first source image derived therefrom;
      identifying locations of corners of a target image in the first scanned image;
      aligning the corners of the target image in the first scanned image to corners of the first source image with a first computed transform to generate an aligned target image;
      detecting respective local features in the source image and aligned target image;
      generating a first feature map from one of the first source image and the target image based on the respective local features;
      generating a second feature map from the other of the first source image and the target image based on the respective local features;
      identifying pixel blocks of the first feature map that include a corner feature;
      for each of the identified blocks, computing a correlation between local features in the identified block and local features in a first block in the second feature map;
      for each of a set of blocks local to the first block in the second feature map, computing a correlation between local features in the identified block and local features in the local block;
      identifying pairs of similar blocks based on the computed correlations; and
      computing a second transform to register the target image with the first source image, based on the pairs of similar blocks; and
   a processor in communication with the memory which executes the instructions.

20. A system comprising the registration component of claim 19 and a scanner which generates the first scanned image.

* * * * *